(12) United States Patent
Carpenter, Jr. et al.

(10) Patent No.: US 11,685,502 B2
(45) Date of Patent: Jun. 27, 2023

(54) MODULAR HYBRID AIRFRAME STRUCTURE FOR BATTERY THERMAL EVENT PROTECTION AND REPAIR

(71) Applicant: Bell Textron Inc., Fort Worth, TX (US)

(72) Inventors: Joseph Richard Carpenter, Jr., Burleson, TX (US); Timothy Brian Carr, Fort Worth, TX (US); Nicholas Hou, Arlington, TX (US); William Anthony Amante, Grapevine, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 193 days.

(21) Appl. No.: 16/916,732

(22) Filed: Jun. 30, 2020

(65) Prior Publication Data

US 2021/0403136 A1 Dec. 30, 2021

(51) Int. Cl.
*B64C 1/06* (2006.01)
*B64C 1/40* (2006.01)
*B64C 1/00* (2006.01)

(52) U.S. Cl.
CPC ............... *B64C 1/061* (2013.01); *B64C 1/40* (2013.01); *B64C 2001/0081* (2013.01)

(58) Field of Classification Search
CPC .. B64C 3/00; B64C 3/18; B64C 3/182; B64C 3/185; B64C 3/187; B64C 3/22; B64C 7/00; B64C 1/00; B64C 1/06; B64C 1/064; B64C 1/066; B64C 1/068; B64C 1/08; B64C 1/18; B64C 1/40; B64C 1/061; B62D 25/20; B60K 1/04; E04B 1/24; E04B 1/30;

(Continued)

(56) References Cited

U.S. PATENT DOCUMENTS

| 10,923,694 B1* | 2/2021 | Pack | H01M 50/519 |
| 11,267,327 B2* | 3/2022 | Matecki | H01M 50/20 |

(Continued)

FOREIGN PATENT DOCUMENTS

| CN | 106114915 A | * 11/2016 | B64C 1/062 |
| CN | 106628135 A | 5/2017 | |

(Continued)

OTHER PUBLICATIONS

Clayton et al. "Subassembly testing and modeling of Self Centering Steel Plate Shear Walls," Sep. 12, 2013, Elsevier (Year: 2013).*

(Continued)

*Primary Examiner* — Joshua J Michener
*Assistant Examiner* — Ryan Andrew Yankey
(74) *Attorney, Agent, or Firm* — Akona IP (57) ABSTRACT

A replaceable web structure for an aircraft frame is described and includes a plurality of structural members fabricated from a first type of material, the replaceable web structure comprising a plurality of web members fabricated from thin sheets of a second type of material, wherein each of the web members is fastened to a web frame of one of the structural members to replace a web portion of the one of the structural members; wherein the second type of material is stronger than the first type of material such that one of the sheets of the second type of material is lighter weight than a sheet of equal strength of the first type of material.

16 Claims, 9 Drawing Sheets

(58) Field of Classification Search
CPC .............. E04B 5/10; E04B 2001/2418; E04B 2002/7477; B64D 2045/009
See application file for complete search history.

(56) References Cited

U.S. PATENT DOCUMENTS

| | | | | |
|---|---|---|---|---|
| 11,548,365 | B2* | 1/2023 | Chu | .................... H01M 50/204 |
| 11,588,338 | B2* | 2/2023 | Zhang | ................. H01M 50/262 |
| 2002/0162696 | A1* | 11/2002 | Maus | ...................... B60K 1/04 |
| | | | | 180/68.5 |
| 2014/0272479 | A1* | 9/2014 | Turbe | ................... H01M 50/24 |
| | | | | 429/50 |
| 2020/0031450 | A1* | 1/2020 | Slaton | ...................... B64C 1/40 |
| 2020/0156486 | A1* | 5/2020 | Howard | .................. B60L 50/64 |
| 2022/0416328 | A1* | 12/2022 | Takahashi | ........... H01M 10/647 |
| 2023/0025278 | A1* | 1/2023 | Karlsson | .................. B60K 1/04 |

FOREIGN PATENT DOCUMENTS

| | | | | |
|---|---|---|---|---|
| CN | 107697280 | A | | 2/2018 |
| DE | 102017216421 | A1 | * | 3/2019 |
| EP | 2783979 | A1 | * | 10/2014 .............. B64C 1/12 |
| EP | 2783979 | A1 | | 10/2014 |
| EP | 2905228 | A1 | * | 8/2015 ............. B64C 1/061 |
| EP | 3450302 | A1 | * | 3/2019 ............. B64C 1/062 |
| EP | 3450302 | A1 | | 3/2019 |
| EP | 3525259 | A1 | | 8/2019 |
| FR | 2770549 | A1 | * | 5/1999 ........... E04B 2/7457 |
| JP | 2017036654 | A | * | 2/2017 ............. E04B 1/215 |
| WO | WO-2012049418 | A2 | * | 4/2012 ............... B60K 1/04 |
| WO | WO-2012165493 | A1 | * | 12/2012 ............... B60K 1/04 |
| WO | 2019028071 | A1 | | 2/2019 |

OTHER PUBLICATIONS

Yuane Wu et al. "High heat resistant carbon fiber/polyimide composites with neutron shielding performance," Mar. 29, 2019, Elsevier (Year: 2019).*

EPO Examination Report issued in EP Application 21173908.1 dated Nov. 9, 2021, 6 pages.

EPO Search Report issued in EP Application 21173908.1 dated Oct. 22, 2021, 4 pages.

* cited by examiner

MODULAR HYBRID AIRFRAME STRUCTURE FOR BATTERY THERMAL EVENT PROTECTION AND REPAIR

TECHNICAL FIELD

This disclosure relates in general to the field of aircraft and, more particularly, though not exclusively, to a modular hybrid structure for providing thermal event protection in such aircraft.

BACKGROUND

"Thermal runaway" occurs in situations in which an increase in temperature changes the conditions in a way that causes a further increase in temperature, often leading to a destructive result. Aircraft batteries are capable of performing to a rated capacity when the ambient temperature of the battery is in a designated range. A combination of high battery temperature, overcharging, and other factors can lead to an uncontrollable rise in battery temperature (i.e., battery thermal runaway, or a "thermal event") that will ultimately destroy the battery, as well as surrounding structure.

One manner in which to protect airframe structures from such battery thermal runaway is to prepackage the batteries in sacrificial or heat resistant materials. This approach allows for easy repair but results in redundant weight.

SUMMARY

One embodiment is a replaceable web structure for an aircraft frame comprising a plurality of structural members fabricated from a first type of material, the replaceable web structure comprising a plurality of web members fabricated from thin sheets of a second type of material, wherein each of the web members is fastened to a web frame of one of the structural members to replace a web portion of the one of the structural members; wherein the second type of material is stronger than the first type of material such that one of the sheets of the second type of material is lighter weight than a sheet of equal strength of the first type of material.

Another embodiment is an aircraft comprising a plurality of structural members fabricated from a first type of material; and a plurality of web members fabricated from thin sheets of a second type of material, wherein each of the web members is fastened to a web frame of one of the structural members to replace a web portion of the one of the structural members; wherein the second type of material is stronger than the first type of material such that one of the sheets of the second type of material is lighter weight than a sheet of equal strength of the first type of material.

Yet another embodiment is a battery compartment for an aircraft, the battery compartment comprising a plurality of beams fabricated from a first type of metal, wherein a web of each of the beams comprises a web member fabricated from a thin sheet of a second type of metal, wherein the second type of material is stronger than the first type of material such that one of the sheets of the second type of material is lighter weight than a sheet of equal strength of the first type of material.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect (s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a modular hybrid structure for providing protection against a thermal event and for facilitating repair after such a thermal event in an aircraft. In accordance with features of embodiments described herein, web members manufactured from titanium sheets are integrated into the airframe structure, acting as both a structural member as well as a replaceable heat shield. The sheets are implemented as structural webs but extend away from the airframe structure and act as a shield for the permanent structure and joints thereof. Embodiments described herein result in a lightweight structure, since thin, temperature resistant sheets are used to replace keel and intercostal web structure. The web thickness in machined parts may be driven by producibility minimums instead of sizing. Sheet metal webs can be thinner and lighter. Embodiments descried herein result in lower repair times, since the thin sheets are the only arts that need to be replaced following the occurrence of a thermal event. Most sheets can be trimmed and fastened at the part level without affecting assembly. Large fastener spacing may be provided, since joints should not pick up load and can use a form in place or preformed heat resistant (firewall type) gasket for easy removal and replacement.

Figure 1A:
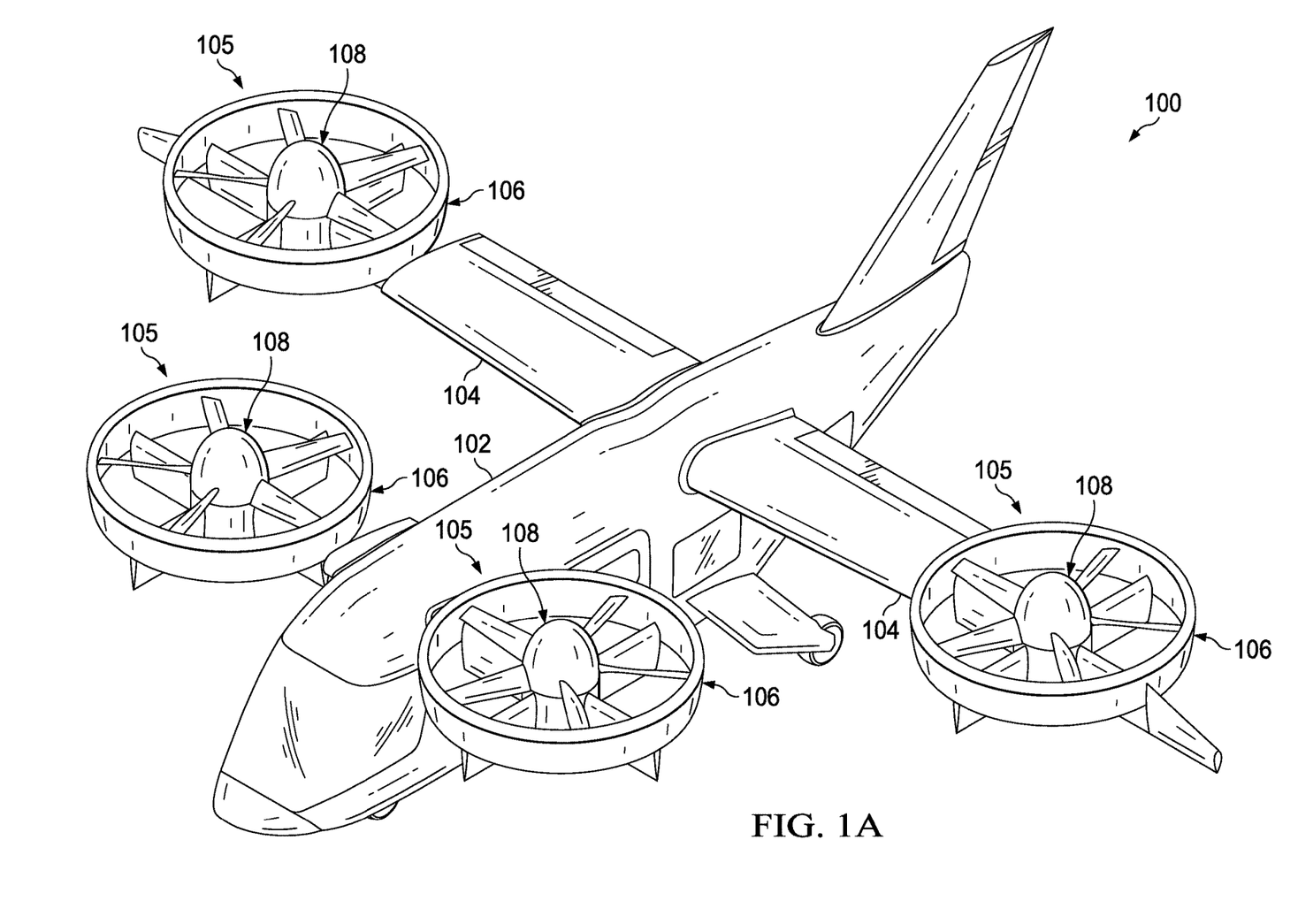
FIGS. 1A-1B are illustrations of an example rotorcraft in which a modular hybrid structure for protection against a thermal event in accordance with embodiments described herein may be implemented.
Figure 1B:
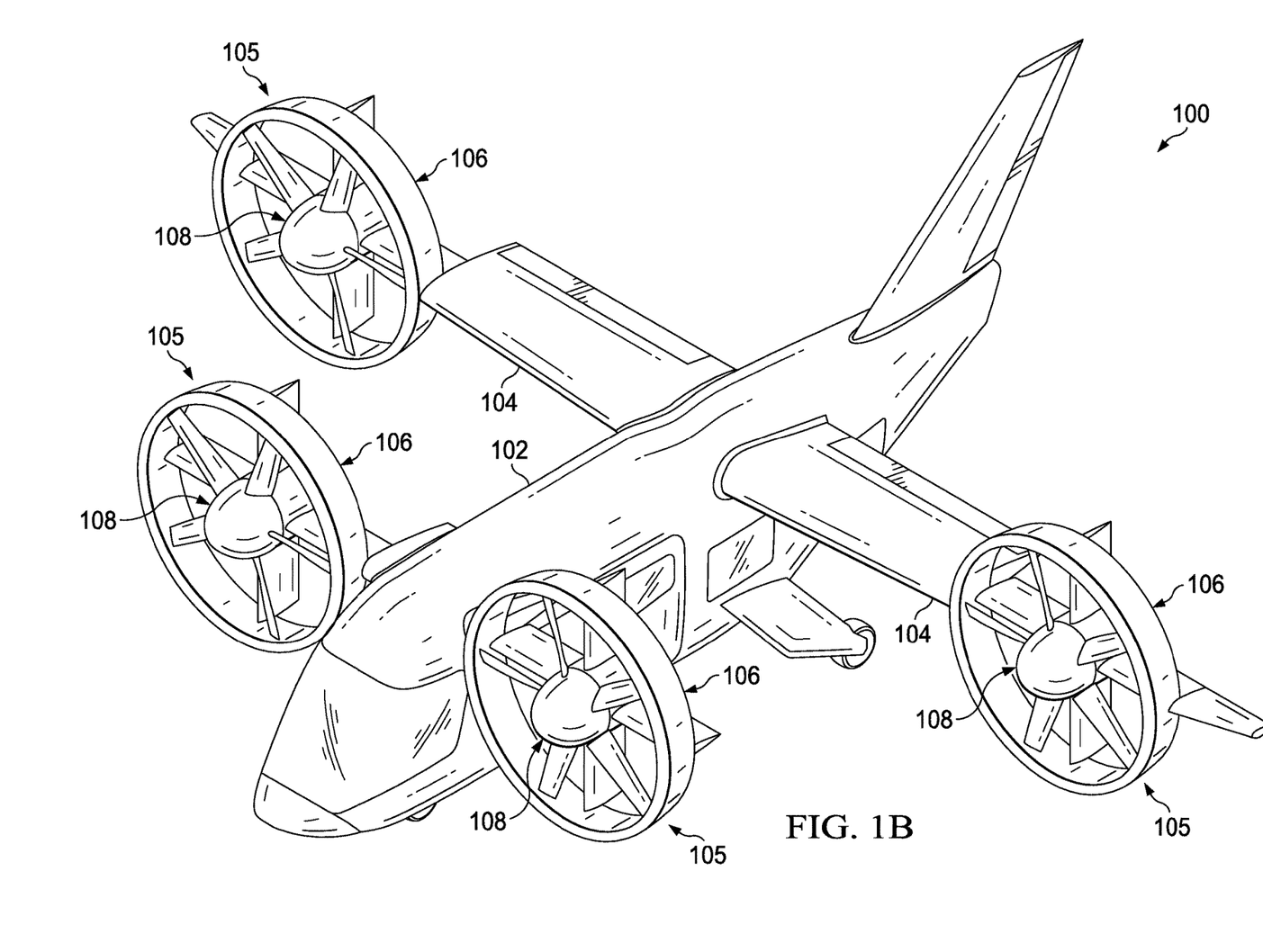

FIGS. 1A and 1B illustrate an example tiltrotor aircraft 100 that includes ducted rotors (or fans). The tiltrotor aircraft 100 is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wings 104, and a plurality propulsion assemblies 105 each comprising a ducted fan 106 rotatably coupled to fuselage 102 or wings 104.

Rotor blade assemblies 108 can be collectively manipulated to selectively control direction, thrust, and lift of tilting ducted fan aircraft 100. Indeed, the collective pitch of rotor blade assemblies 108 may be independently controlled from one another to allow for differential thrust output by ducted fans 106. For example, the collective pitch of the rotor blade assembly of one ducted fan may be higher or lower than the collective pitch of rotor blade assembly of another ducted fan such that the thrust generated by each ducted fan differs from each of the others.

Ducted fans 106 are each convertible, relative to fuselage 102, between a horizontal position, as shown in FIG. 1A, and a vertical position, as shown in FIG. 1B. Ducted fans 106 are in the horizontal position during vertical takeoff and landing mode. Vertical takeoff and landing mode may be considered to include hover operations of tilting ducted fan aircraft 100. Ducted fans 106 are in the vertical position during forward flight mode, in which tilting ducted fan aircraft 100 is in forward flight. In forward flight mode, ducted fans 106 direct their respective thrusts in the aft direction to propel tilting ducted fan aircraft 10 forward. Tilting ducted fan aircraft 100 is operable to fly in all directions during the vertical takeoff and landing mode configuration of FIG. 1A, although faster forward flight is achievable while in the forward flight mode configuration of FIG. 1B. Ducted fans 106 may be tiltable between the vertical and horizontal positions by a rotatable shafts (not shown) extending through wings 104 and which are rotatable in response to commands originating from a pilot and/or a flight control system.

Figure 2:
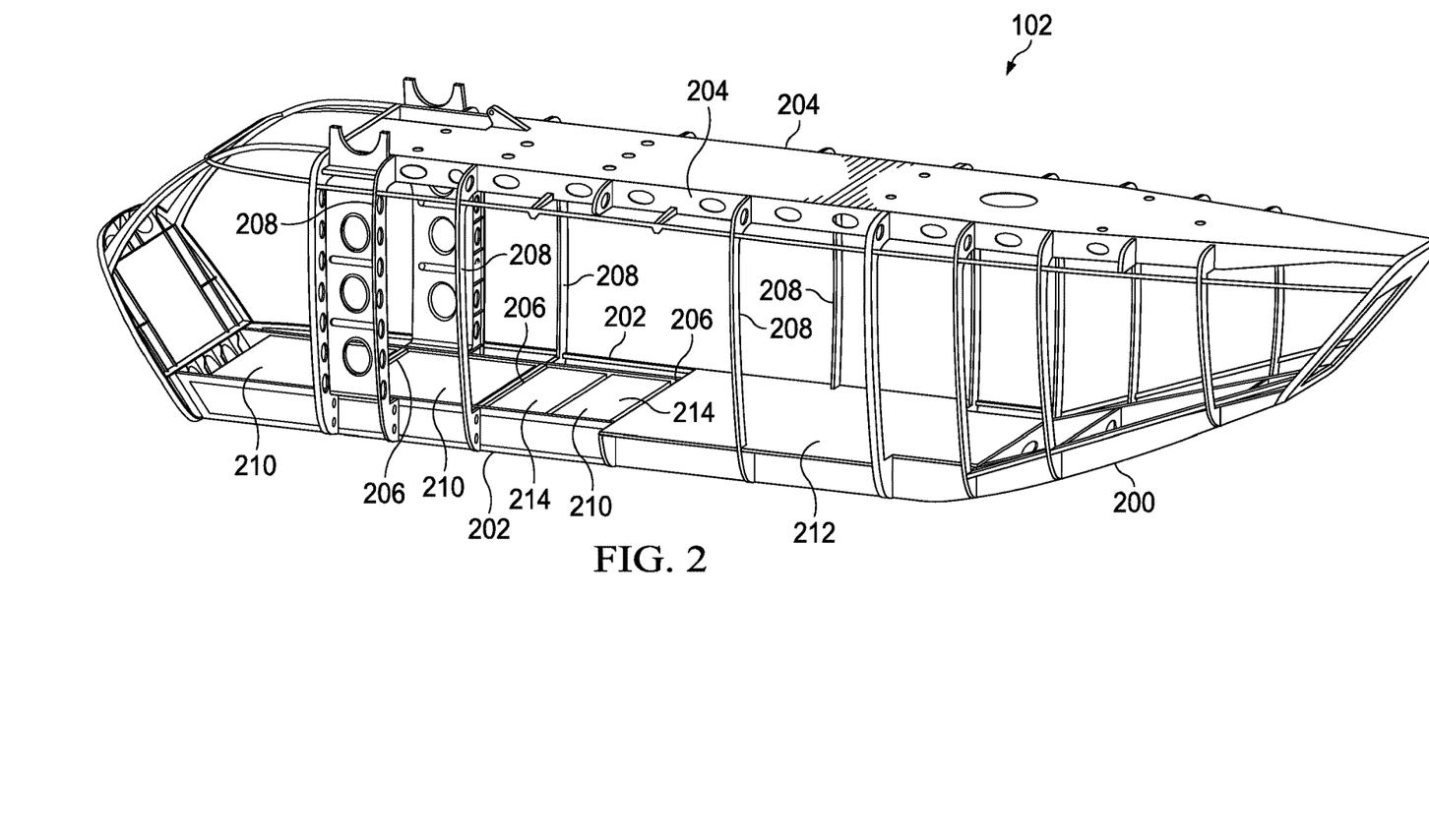
FIG. 2 is a perspective view of the airframe of the fuselage of the example rotorcraft of FIGS. 1A-1B in connection in which a modular hybrid structure for protection against a thermal event in accordance with embodiments described herein may be implemented.
Figure 3:
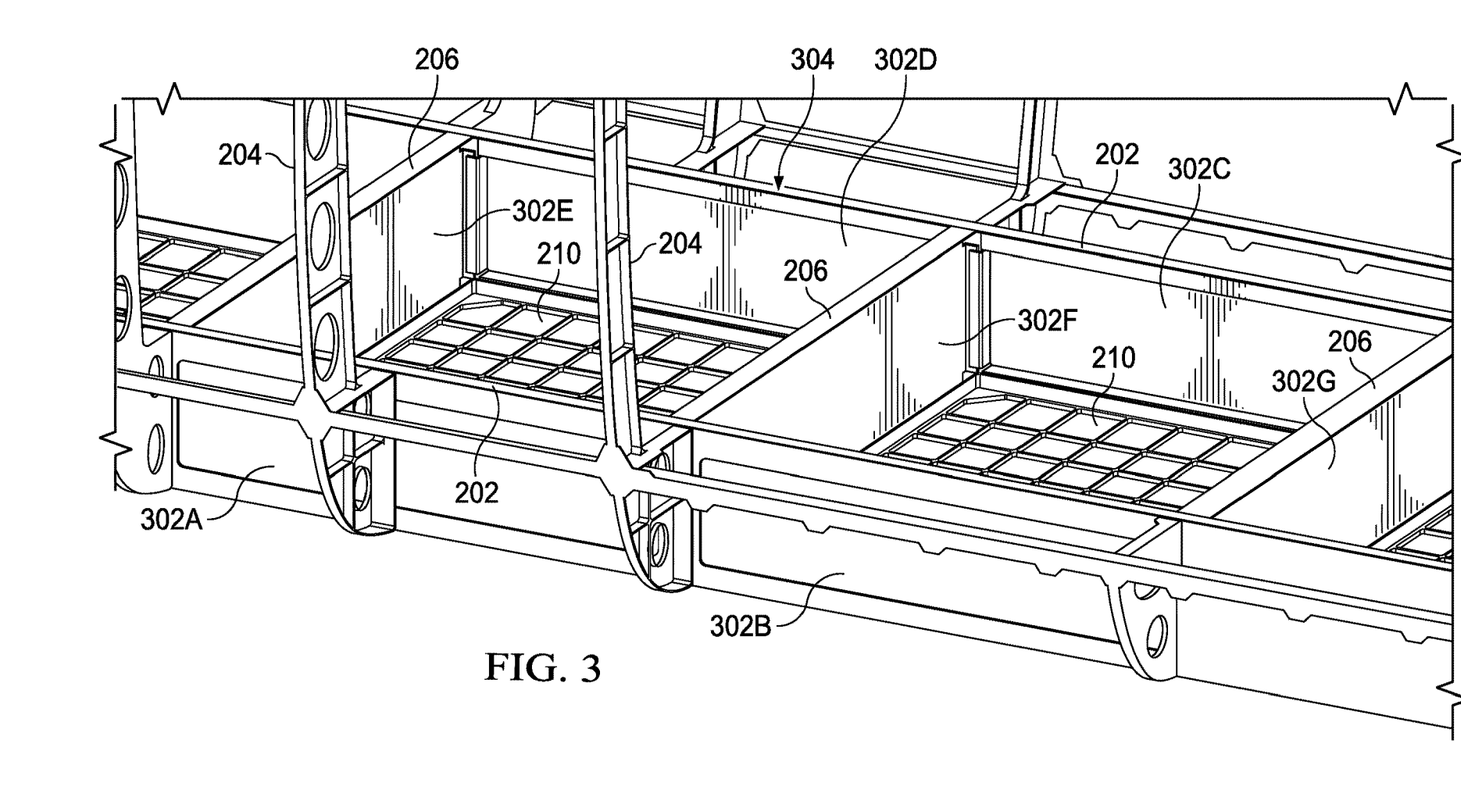
FIG. 3 illustrates battery storage compartments of the fuselage airframe of FIG. 2 illustrating details of a modular hybrid structure for protection against a thermal event in accordance with embodiments described herein.

FIG. 2 illustrates the fuselage 102 with the skin removed to expose a fuselage airframe 200. As shown in FIG. 2, airframe 200 includes keel beams 202, roof beams 204, intercostals 206, and a plurality of frame members 208 extending between and connected at opposite ends to keel beams 202 and roof beams 204. A plurality of battery storage compartments, represented in FIG. 2 by battery storage compartments 210, are disposed between keel beams 202 beneath a floor 212 (a forward portion of which is removed in FIG. 2 to reveal the battery storage compartments 210) for containing battery cells, represented in FIG. 2 by battery cells 214. FIG. 3 illustrates battery storage compartments 210 in greater detail. As shown in FIG. 3, and as will be described in greater detail below, the majority of the web portions of certain structural members of the airframe 200 that surround the battery storage compartments 210 (e.g., portions of webs of keel beams 202 and intercostals 206) have been removed, leaving a window of sorts through the webs of keel beams and intercostals, and are replaced with thin, lightweight, temperature-resistant metal sheets, such as titanium sheets, represented in FIG. 3 by replaceable web members 302A-302G. The web members 302A-302G collectively comprise a replaceable web structure 304 which, in combination with structural members 202, 206, into which they are incorporated, comprises a modular hybrid structure for protection against a thermal event in accordance with embodiments described herein.

Figure 4:
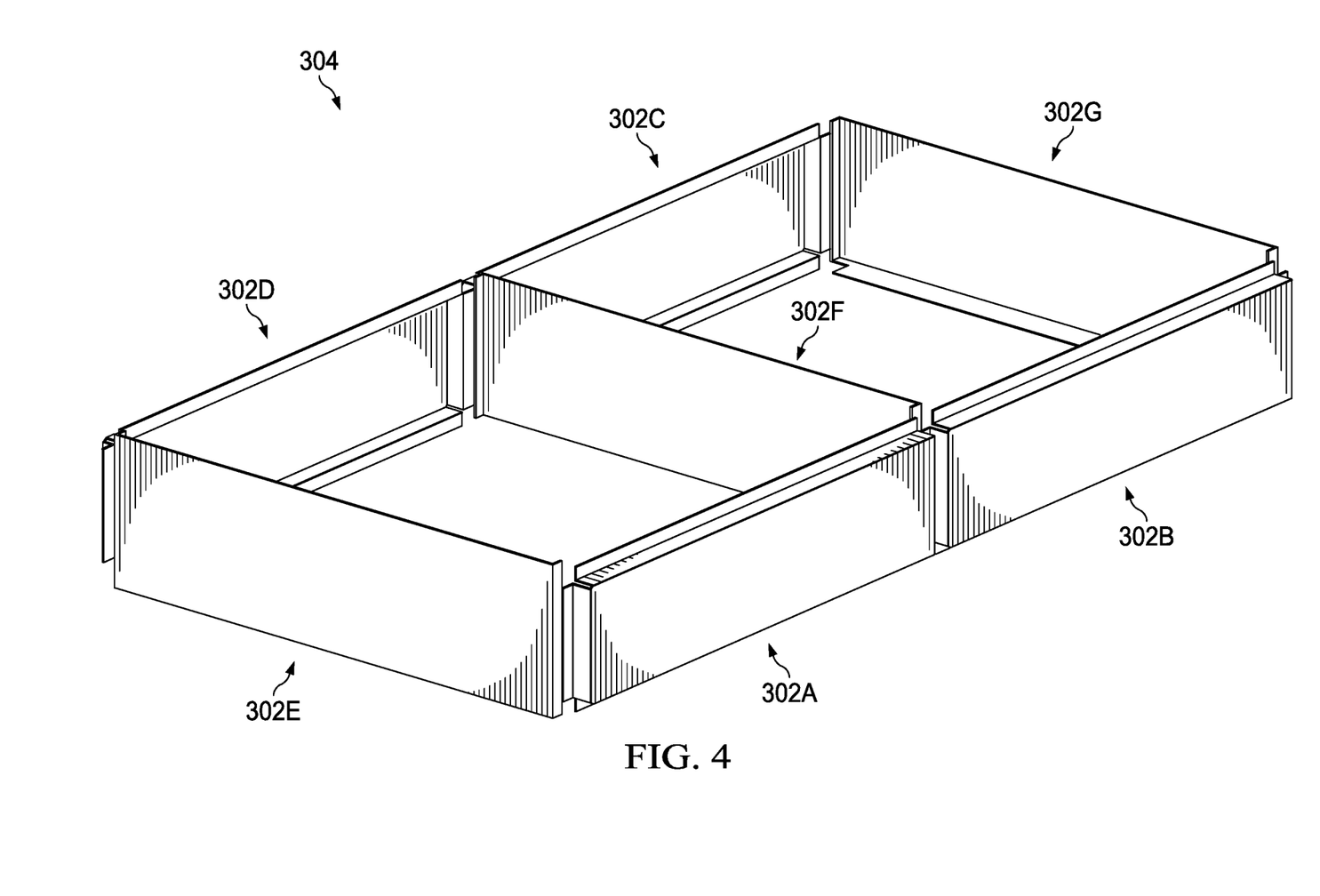
FIG. 4 illustrates an exploded view of a replaceable web structure of the fuselage airframe of FIG. 2 illustrating details of a modular hybrid structure for protection against a thermal event in accordance with embodiments described herein.
Figure 5:
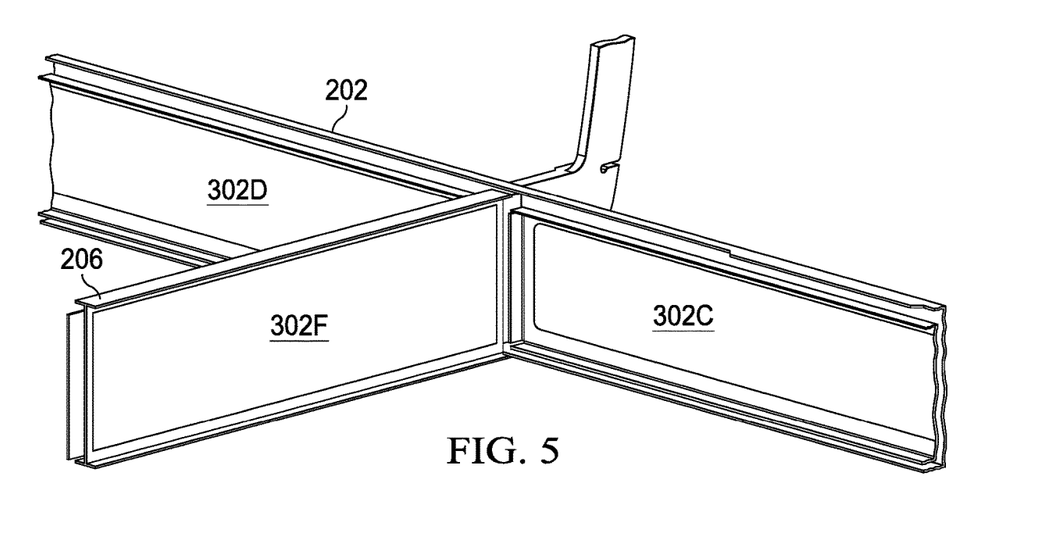
FIGS. 5 and 6 illustrate in greater detail an arrangement of certain titanium web members in connection with corresponding airframe structural members for implementing a modular hybrid structure for protection against a thermal event in accordance with embodiments described herein.
Figure 6:
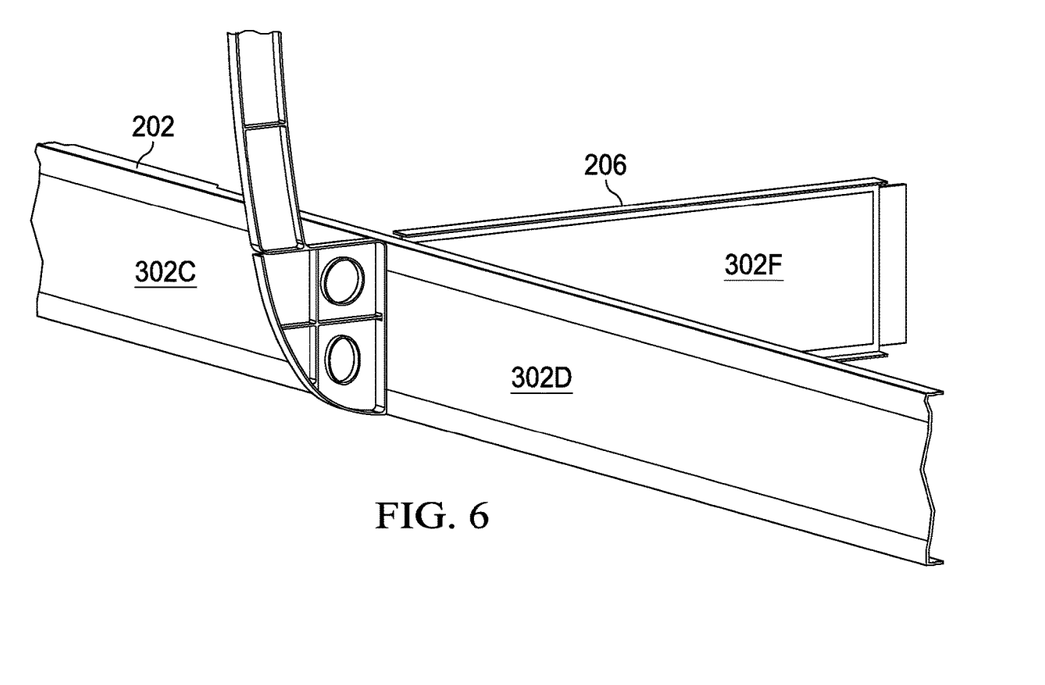

FIG. 4 illustrates an exploded view of the replaceable web structure 304 illustrating details of each of the replaceable titanium web members 302A-302G in accordance with embodiments described herein. FIGS. 5 and 6 illustrate in greater detail arrangement of certain titanium web members (i.e., titanium web members 302C, 302D, and 302F) in connection with corresponding airframe structural members (i.e., keel beam 202 and intercostal 206). In particular, FIG. 5 is a view from inside the airframe facing outward, while FIG. 6 is a view from outside the airframe facing inward. As shown in FIGS. 5 and 6, a majority of web portions of keel beam 202 and intercostal 206 have been removed and replaced with replaceable thin titanium metal sheets (i.e., web members 302C, 302D, and 302F), which are bolted to respective structural member, as described in greater detail below, such that the majority of the webs of structural members effectively comprise lightweight, heat-resistant sheet metal that may be easily replaced in the event of a thermal runaway incident.

Figure 7A:
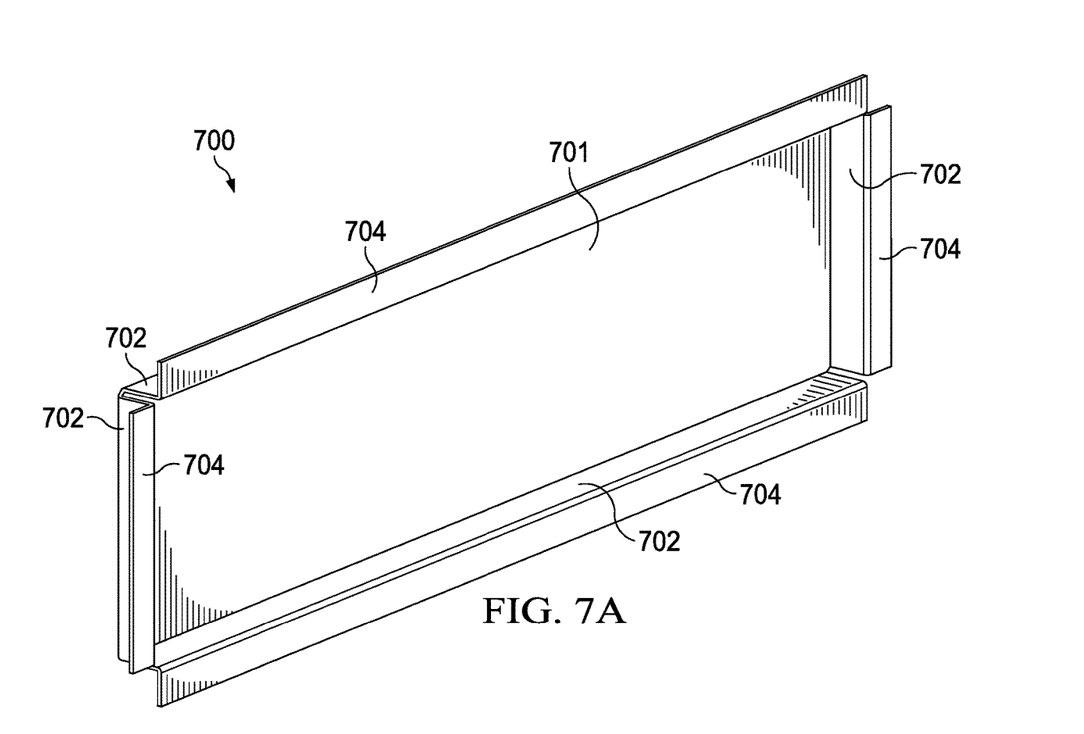
FIGS. 7A and 7B illustrate example titanium sheet metal web members for use in connection with a modular hybrid structure for protection against a thermal event in accordance with embodiments described herein.

FIG. 7A illustrates an example titanium sheet metal web member 700 for use in connection with a keel beam, such as keel beams 202 (FIG. 2), for replacing a portion of the web thereof. The sheet metal web member 700 may be used to implement web members 302A-302D (FIG. 3). As shown in FIG. 7A, in one embodiment, the web member 700 includes a rectangular web replacement portion 701 that has first flanges 702 disposed on each of the four edges thereof and extending in a direction normal to the plane of the rectangular web replacement portion 701. Additionally, second flanges 704 are connected to each of first flanges 702 and extend outward away from the rectangular web replacement portion 701 in a direction parallel to the plane of the rectangular web replacement portion 701. As a result, each edge of the web member 700 approximates a Z channel comprising the edge of the web replacement portion 701, the flange 702 and the flange 704. It will be recognized that other shapes and configurations may be used for implementing keel beam web members such as described herein.

Figure 7B:
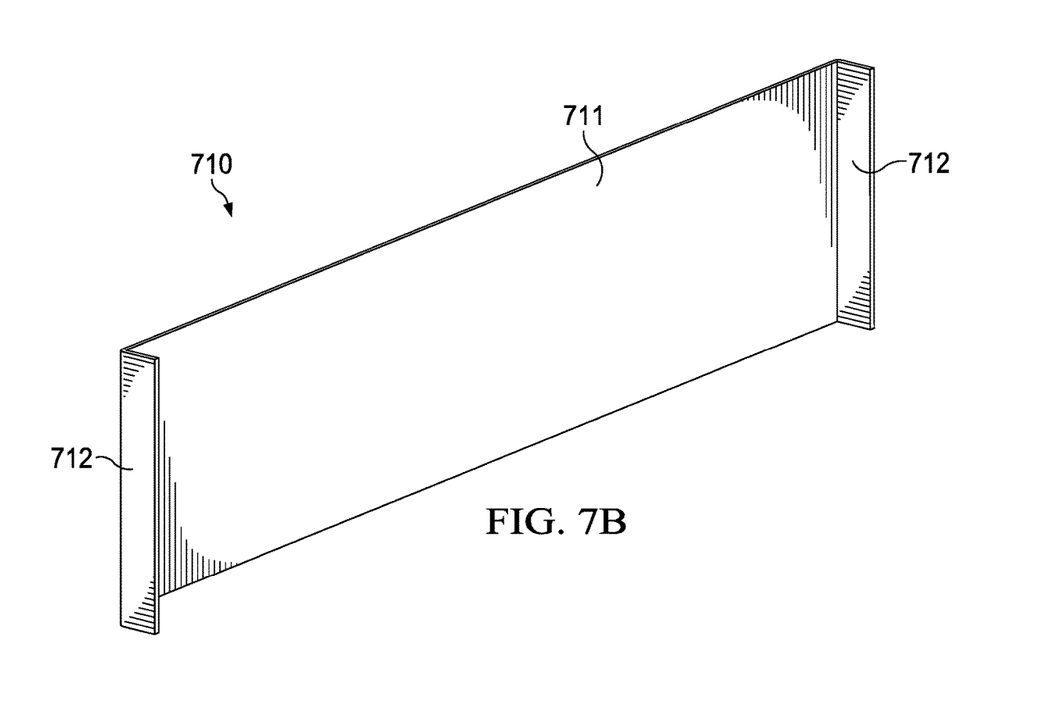

FIG. 7B illustrates an example titanium sheet metal web member 710 for use in connection with an intercostal, such as intercostals 206 (FIG. 2) for replacing a portion of the web thereof. The sheet metal web member 710 may be used to implement webs members 302E-302G (FIG. 3). As shown in FIG. 7B, in one embodiment, the web member 710 includes a rectangular web replacement portion 711 that has first flanges 712 disposed on opposite side edges thereof such that they approximate an L channel. Top and bottom edges of the rectangular web replacement portion 711 terminate without flanges. It will be recognized that other shapes and configurations may be used for implementing keel beam web members such as described herein.

Figure 8:
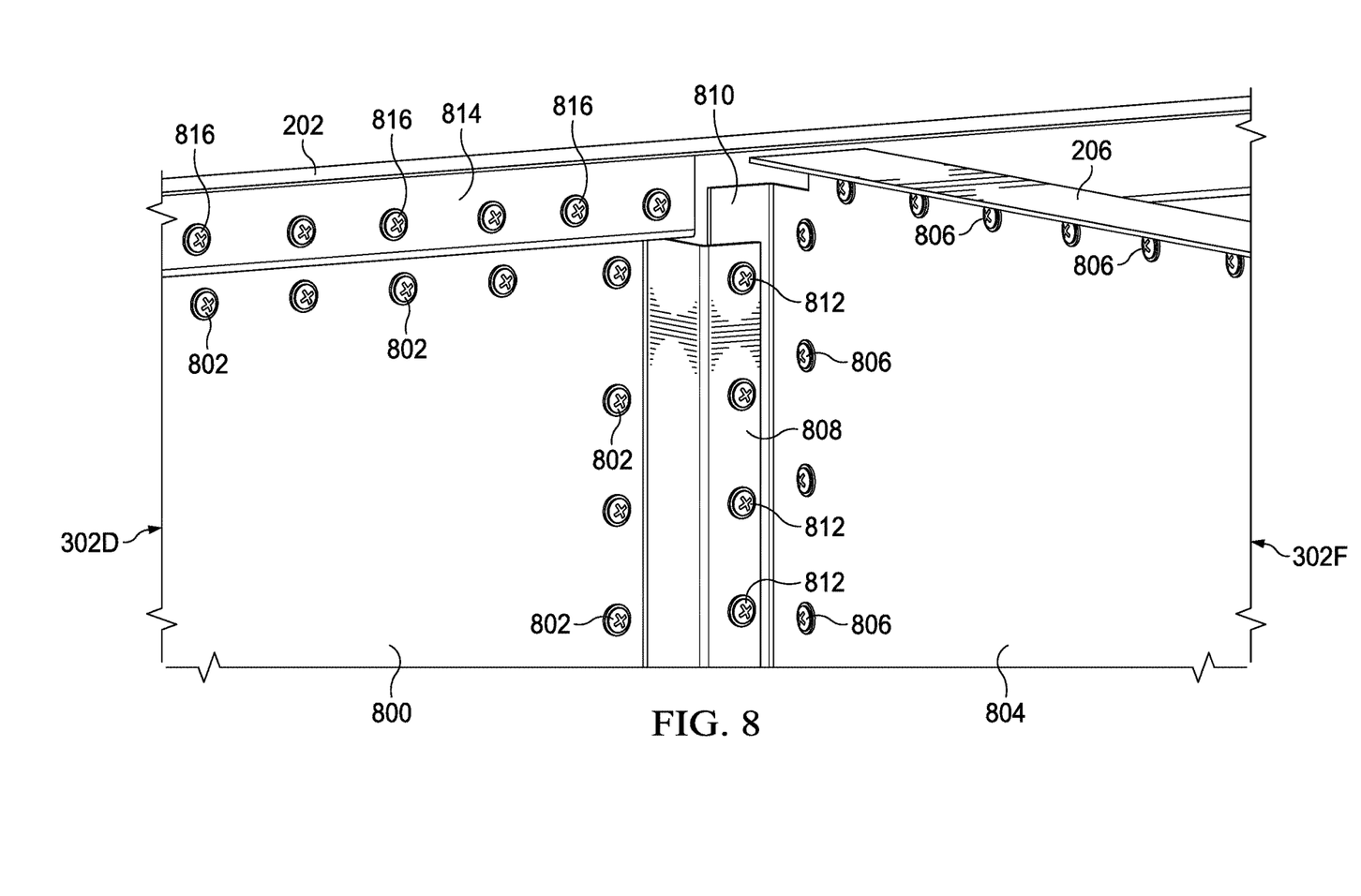
FIGS. 8-10 are various views illustrating an example mechanism for fastening web members to structural members and to one another to form a modular hybrid structure for protection against a thermal event in accordance with embodiments described herein.

FIG. 8 illustrates an example mechanism for fastening web members (e.g., web members 302D, 302F) to structural members (e.g., keel beam 202, intercostal 206) and to one another to form a replaceable web structure (e.g., replaceable web structure 304). As shown in FIG. 8, a web replacement portion 800 of web member 302D is secured to a web frame portion (i.e., the remaining portion of the web) of keel beam 202 via a series of fasteners 802 disposed along each edge of web replacement portion 800. Similarly, a web replacement portion 804 of web member 302F is secured to a web frame portion (i.e., the remaining portion of the web) of intercostal 206 via a series of fasteners 806 disposed along each edge of web replacement portion 804 and securing.

Figure 10:
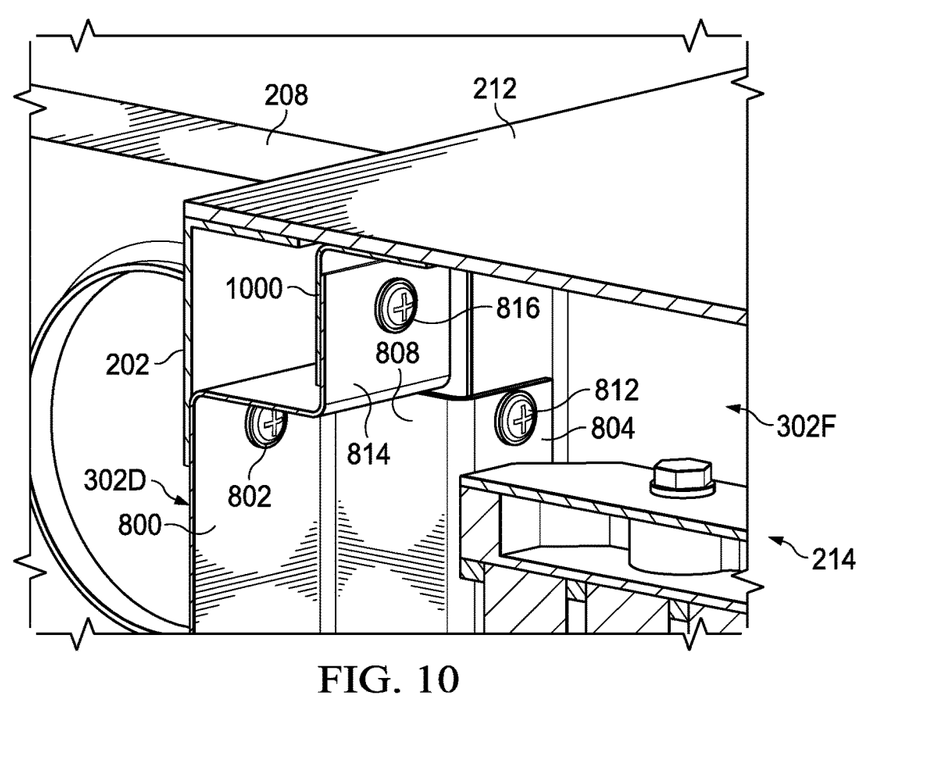

A flange 808 along a side end of web member 302D overlaps with a similar flange 810 along a side end of web member 302F and the flanges 808, 810, are secured to one another via a series of fasteners 812 along the length of flanges 808, 810. In accordance with features of embodiments described herein, a flange 814 along the upper edge of web member 302D is secured to a belly panel angle (not shown in FIG. 8 for purposes of clarity) via a series of fasteners 816 disposed along the length of the flange 814. In certain embodiments, fasteners 802, 806, 816, are implemented using threaded bolts secured in place via a threaded nut, as illustrated in FIG. 10. It will be recognized that, while the fasteners 802, 806, 816, add weight to the airframe structure, the added weight is more than compensated for by the replacement of web portions of keel beams and intercostals, fabricated from aluminum and/or aluminum alloy, with much lighter weight titanium sheet metal web portions such that the overall weight of the airframe may actually be reduced through use of the modular hybrid structure for protection against a thermal event in accordance with embodiments described herein.

Figure 9:
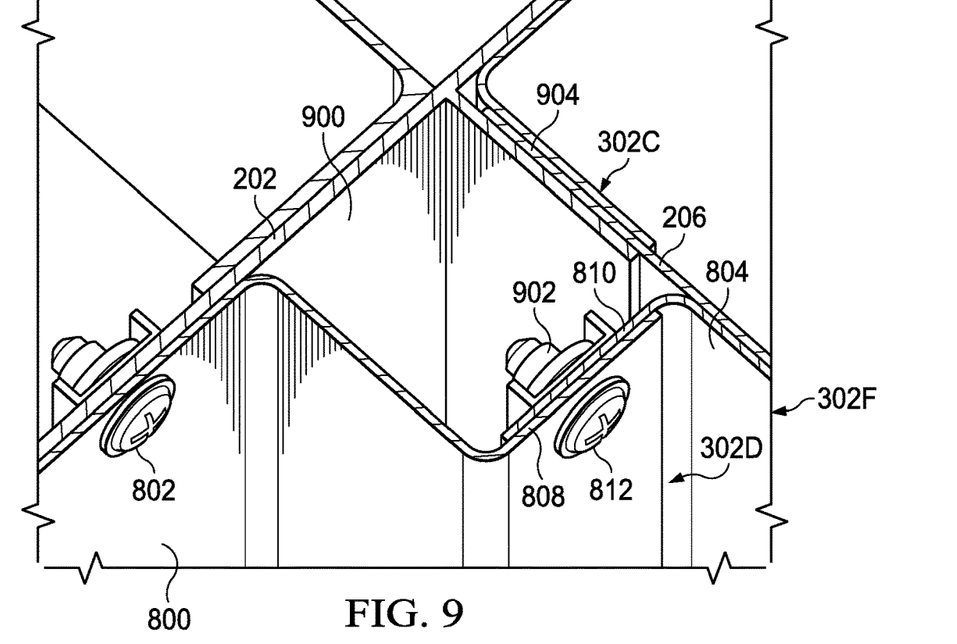

FIG. 9 is a partial cutaway view of FIG. 8 illustrating a top down view of the connection between flange 808 of web member 302D and flange 810 of web member 302F. As clearly shown in FIG. 9, an airgap 900 created by flanges 810, 812, provides space to accommodate fastener securing means, such as a nut 902, of fasteners 812. Airgap 900 further provides thermal event protection for a joint 904 between keel beam 202 and intercostal 206.

FIG. 10 is a partial cutaway view of FIG. 8 illustrating an aft-facing view of the connection between flange 814 and a titanium angle 1000 (connected to floor 212) via fastener 816, the connection between web member 302D and keel beam 202 via fastener 802, and the connection between flange 804 of web member 302D and flange 810 (not shown in FIG. 10) of web member 302F via fastener 812, all relative to battery cell 214.

It should be appreciated that aircraft 100 is merely illustrative of a variety of aircraft that may implement the embodiments described herein and that the modular hybrid structure for thermal event protection described herein may be utilized on any aircraft or other type of vehicle that uses one or more batteries as an energy source.

Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein can be integrated into a variety of aircraft configurations. It should be appreciated that even though aircraft are particularly well-suited to implement the embodiments of the present disclosure, non-aircraft vehicles and devices can also implement the embodiments.

The components of rotor assembly 108 may comprise any materials suitable for use with an aircraft rotor. While rotor hub assembly 108 are shown with four rotor blades 114, respectively, it should be understood that they may have as few as two rotor blades and may have more than four rotor blades.

Example 1 is a replaceable web structure for an aircraft frame comprising a plurality of structural members fabricated from a first type of material, the replaceable web structure comprising a plurality of web members fabricated from thin sheets of a second type of material, wherein each of the web members is fastened to a web frame of one of the structural members to replace a web portion of the one of the structural members, wherein the second type of material is stronger than the first type of material such that one of the sheets of the second type of material is lighter weight than a sheet of equal strength of the first type of material.

In Example 2, the replaceable web structure of Example 1 may further include the first type of material being at least one of aluminum and aluminum alloy.

In Example 3, the replaceable web structure of any of Examples 1 and 2 may further include the second type of material being titanium.

In Example 4, the replaceable web structure of any of Examples 1-3 may further include each of the web members including a flange along at least one edge thereof.

In Example 5, the replaceable web structure of any of Examples 1~4 may further include the flange of a first one of the web members being fastened to the flange of the second one of the web members.

In Example 6, the replaceable web structure of any of Examples 1-5 may further include the structural members comprising at least one of keel beams and intercostals.

In Example 7, the replaceable web structure of any of Examples 1-6 may further include the structural members surrounding a battery compartment.

In Example 8, the replaceable web structure of any of Examples 1-7 may further include the web members being fastened to the structural members with removable fasteners.

In Example 9, the replaceable web structure of any of Examples 1-8 may further include the removable fasteners comprising pairs of nuts and bolts.

Example 10 is an aircraft comprising a plurality of structural members fabricated from a first type of material; and a plurality of web members fabricated from thin sheets of a second type of material, wherein each of the web members is fastened to a web frame of one of the structural members to replace a web portion of the one of the structural members, wherein the second type of material is stronger than the first type of material such that one of the sheets of the second type of material is lighter weight than a sheet of equal strength of the first type of material.

In Example 11, the aircraft of Example 10 may further include the first type of material being at least one of aluminum and aluminum alloy.

In Example 12, the aircraft of any of Examples 10-11 may further include the second type of material being titanium.

In Example 13, the aircraft of any of Examples 10-12 may further include the web members including a flange along at least one edge thereof.

In Example 14, the aircraft of any of Examples 10-13 may further include the flange of a first one of the web members being fastened to the flange of the second one of the web members.

In Example 15, the aircraft of any of Examples 10-14 may further include the structural members comprising at least one of keel beams and intercostals.

In Example 16, the aircraft of any of Examples 10-15 may further include the structural members surrounding a battery compartment.

In Example 17, the aircraft of any of Examples 10-16 may further include the web members being fastened to the structural members with removable fasteners.

Example 18 is a battery compartment for an aircraft, the battery compartment comprising a plurality of beams fabricated from a first type of metal, wherein a web of each of the beams comprises a web member fabricated from a thin sheet of a second type of metal, wherein the second type of material is stronger than the first type of material such that one of the sheets of the second type of material is lighter weight than a sheet of equal strength of the first type of material.

In Example 19, the battery compartment of Example 18 may further include the first type of metal being at least one of aluminum and aluminum alloy and the second type of material being titanium.

In Example 20, the battery compartment of any of Examples 18-19 may further include the web members being fastened to the beams using removable fasteners.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An aircraft frame comprising:
a plurality of structural members fabricated from a first type of material, wherein each of the structural members comprises a web frame and a web portion within the web frame;
a plurality of web members fabricated from sheets of a second type of material, wherein each of the web members is fastened to the web frame of a respective structural member of the plurality of structural members to comprise the web portion of the structural member, wherein each of the web members includes a flange along at least one edge thereof; and
a plurality of fasteners for securing the flange of a first one of the web members to the flange of a second one of the web members to create an airgap to accommodate the fasteners, the airgap further providing thermal protection for a joint between the structural members to which the first and second ones of the web members are attached;
wherein the second type of material is stronger than the first type of material such that one of the sheets of the second type of material is lighter weight than a sheet of equal strength of the first type of material; and
wherein the second type of material is more heat-resistant than the first material.

2. The aircraft frame of claim 1, wherein the first type of material is at least one of aluminum and aluminum alloy.

3. The aircraft frame of claim 1, wherein the second type of material is titanium.

4. The aircraft frame of claim 1, wherein the structural members comprise at least one of keel beams and intercostals.

5. The aircraft frame of claim 1, wherein the structural members surround a battery compartment.

6. The aircraft frame of claim 1, wherein the web members are fastened to the structural members with removable fasteners.

7. The aircraft frame of claim 5, wherein the removable fasteners comprise pairs of nuts and bolts.

8. An aircraft comprising:
a plurality of structural members fabricated from a first type of material, wherein each of the structural members comprises a web frame and a web portion within the web frame;
a plurality of web members fabricated from sheets of a second type of material, wherein each of the web members is fastened to the web frame of a respective structural member of the plurality of structural members to comprise the web portion of the structural member, wherein each of the web members includes a flange along at least one edge thereof; and
a plurality of fasteners for securing the flange of a first one of the web members to the flange of a second one of the web members to create an airgap to accommodate the fasteners, the airgap further providing thermal protection for a joint between the structural members to which the first and second ones of the web members are attached;
wherein the second type of material is stronger than the first type of material such that one of the sheets of the second type of material is lighter weight than a sheet of equal strength of the first type of material; and
wherein the second type of material is more heat-resistant than the first material.

9. The aircraft of claim 8, wherein the first type of material is at least one of aluminum and aluminum alloy.

10. The aircraft of claim 8, wherein the second type of material is titanium.

11. The aircraft of claim 8, wherein the structural members comprise at least one of keel beams and intercostals.

12. The aircraft of claim 8, wherein the structural members surround a battery compartment.

13. The aircraft of claim 8, wherein the web members are fastened to the structural members with removable fasteners.

14. An aircraft battery compartment, the aircraft battery compartment comprising:
   a plurality of beams fabricated from a first type of metal, wherein a web of each of the beams comprises a web member fabricated from a sheet of a second type of metal, wherein the second type of metal is stronger and more heat resistant than the first type of metal such that the sheet of the second type of material is lighter weight than a sheet of equal strength of the first type of material;
   wherein each of the web members includes a flange along at least one edge thereof, the battery compartment further comprising a plurality of fasteners for securing the flange of a first one of the web members the flange of a second one of the web members to create an airgap to accommodate the fasteners, the airgap further providing thermal protection for a joint between the structural members to which the first and second ones of the web members are attached.

15. The aircraft battery compartment of claim 14, wherein the first type of metal is at least one of aluminum and aluminum alloy and the second type of material is titanium.

16. The aircraft battery compartment of claim 14, wherein the web members are fastened to the beams using removable fasteners.

* * * * *